(12) United States Patent
Yamauchi

(10) Patent No.: US 8,851,139 B2
(45) Date of Patent: Oct. 7, 2014

(54) PAPER STRIPPING MEMBER AND IMAGE FORMING APPARATUS

(71) Applicant: Sharp Kabushiki Kaisha, Osaka (JP)

(72) Inventor: Hirokazu Yamauchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 50 days.

(21) Appl. No.: 13/665,284

(22) Filed: Oct. 31, 2012

(65) Prior Publication Data

US 2013/0105091 A1    May 2, 2013

(30) Foreign Application Priority Data

Oct. 31, 2011   (JP) ................................ 2011-238107

(51) Int. Cl.

| | |
|---|---|
| *B32B 38/10* | (2006.01) |
| *G03G 15/00* | (2006.01) |
| *B32B 43/00* | (2006.01) |
| *B26F 1/00* | (2006.01) |
| *B32B 37/00* | (2006.01) |

(52) U.S. Cl.
CPC .......... *B32B 43/006* (2013.01); *G03G 15/6532* (2013.01); *B26F 1/00* (2013.01); *B32B 37/00* (2013.01)
USPC ........... 156/762; 156/715; 156/716; 156/717; 156/765; 399/279; 399/297; 399/303; 399/304; 399/310; 399/313; 399/315; 399/316

(58) Field of Classification Search
None
See application file for complete search history.

(56) References Cited

U.S. PATENT DOCUMENTS

| | | | | |
|---|---|---|---|---|
| 7,702,277 | B2 * | 4/2010 | Yamauchi et al. | 399/399 |
| 7,769,313 | B2 * | 8/2010 | Matsuyama et al. | 399/100 |
| 8,005,412 | B2 * | 8/2011 | Sakashita et al. | 399/316 |
| 2001/0033760 | A1 * | 10/2001 | Sawanaka et al. | 399/316 |
| 2002/0131796 | A1 * | 9/2002 | Kida et al. | 399/316 |
| 2006/0198668 | A1 * | 9/2006 | Tsujita | 399/315 |
| 2007/0092310 | A1 * | 4/2007 | Tsujita | 399/315 |
| 2007/0104502 | A1 * | 5/2007 | Ogihara et al. | 399/66 |
| 2007/0297836 | A1 * | 12/2007 | Kawasaki et al. | 399/310 |
| 2008/0145117 | A1 * | 6/2008 | Takiguchi et al. | 399/350 |
| 2009/0003895 | A1 * | 1/2009 | Yamauchi et al. | 399/313 |
| 2009/0263161 | A1 * | 10/2009 | Yamauchi et al. | 399/222 |

FOREIGN PATENT DOCUMENTS

| | | |
|---|---|---|
| JP | 09-043995 | 2/1997 |
| JP | 2001-255683 | 9/2001 |
| JP | 2006-240860 | 9/2006 |

* cited by examiner

*Primary Examiner* — Philip Tucker
*Assistant Examiner* — Nickolas Harm
(74) *Attorney, Agent, or Firm* — Nixon & Vanderhye P.C.

(57) ABSTRACT

A paper stripping member is removably supported by a supporting member disposed facing a circumferential surface of a photoreceptor drum, and strips a paper sheet off the circumferential surface. The paper stripping member includes an acute-shaped stripping nail, a holding member and a cover member. The holding member is configured removably from the supporting member, and holds the stripping nail in such a manner that the stripping nail extends toward the circumferential surface. The cover member is configured removably from the holding member, and covers at least part of the stripping nail in the extending direction of the stripping nail in a state where the cover member is attached to the holding member.

14 Claims, 13 Drawing Sheets

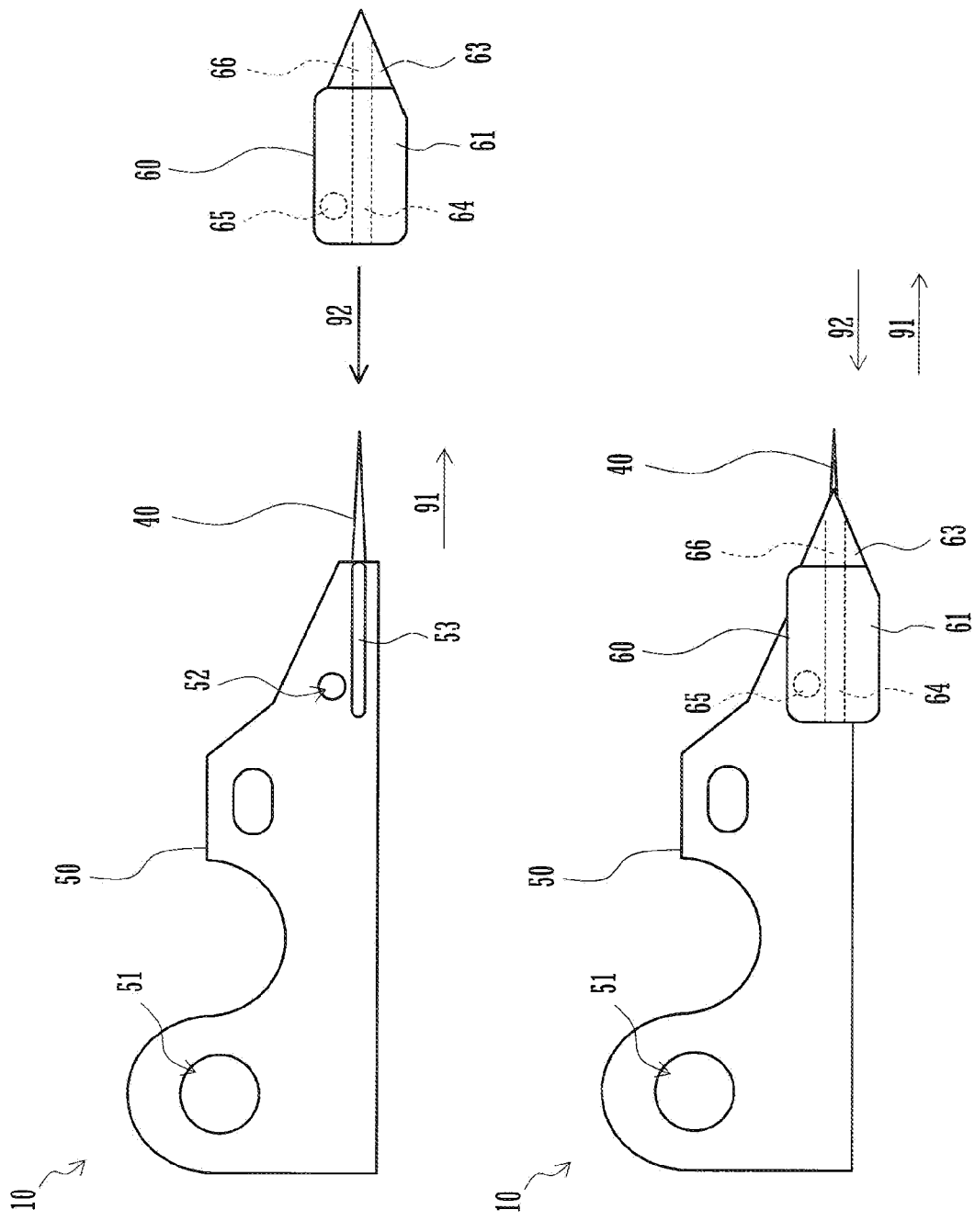

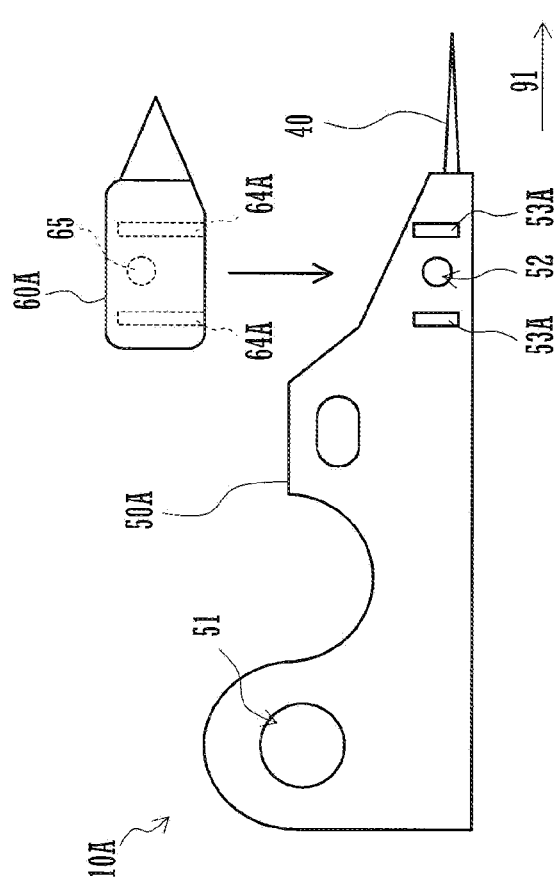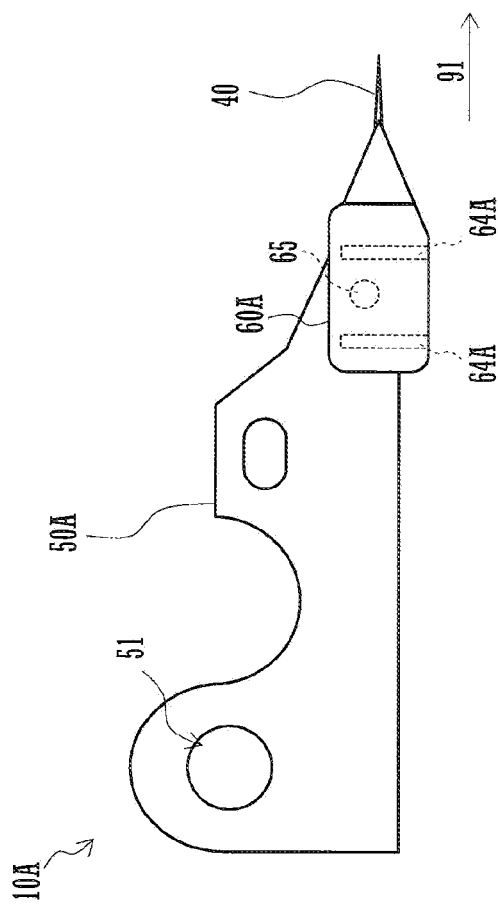

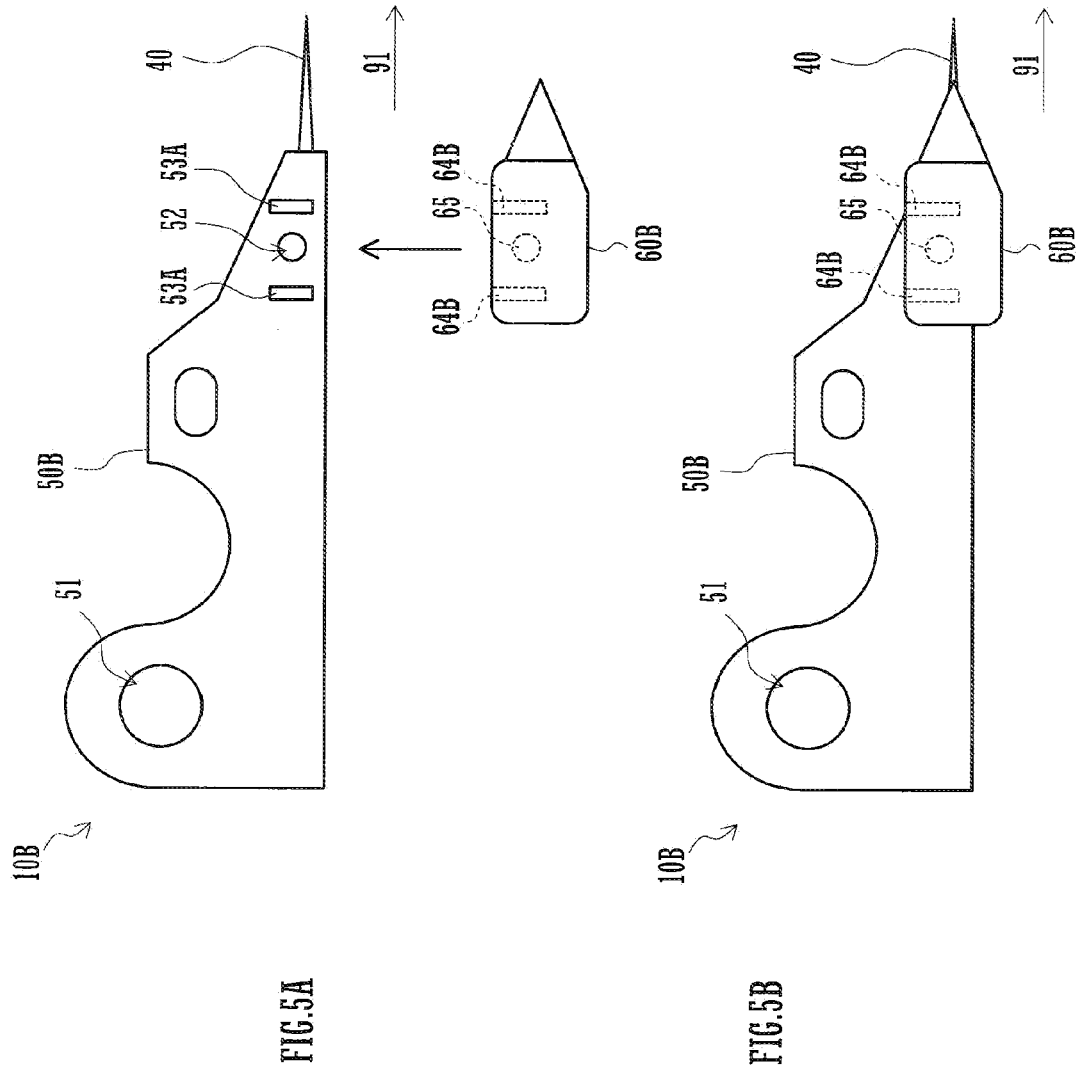

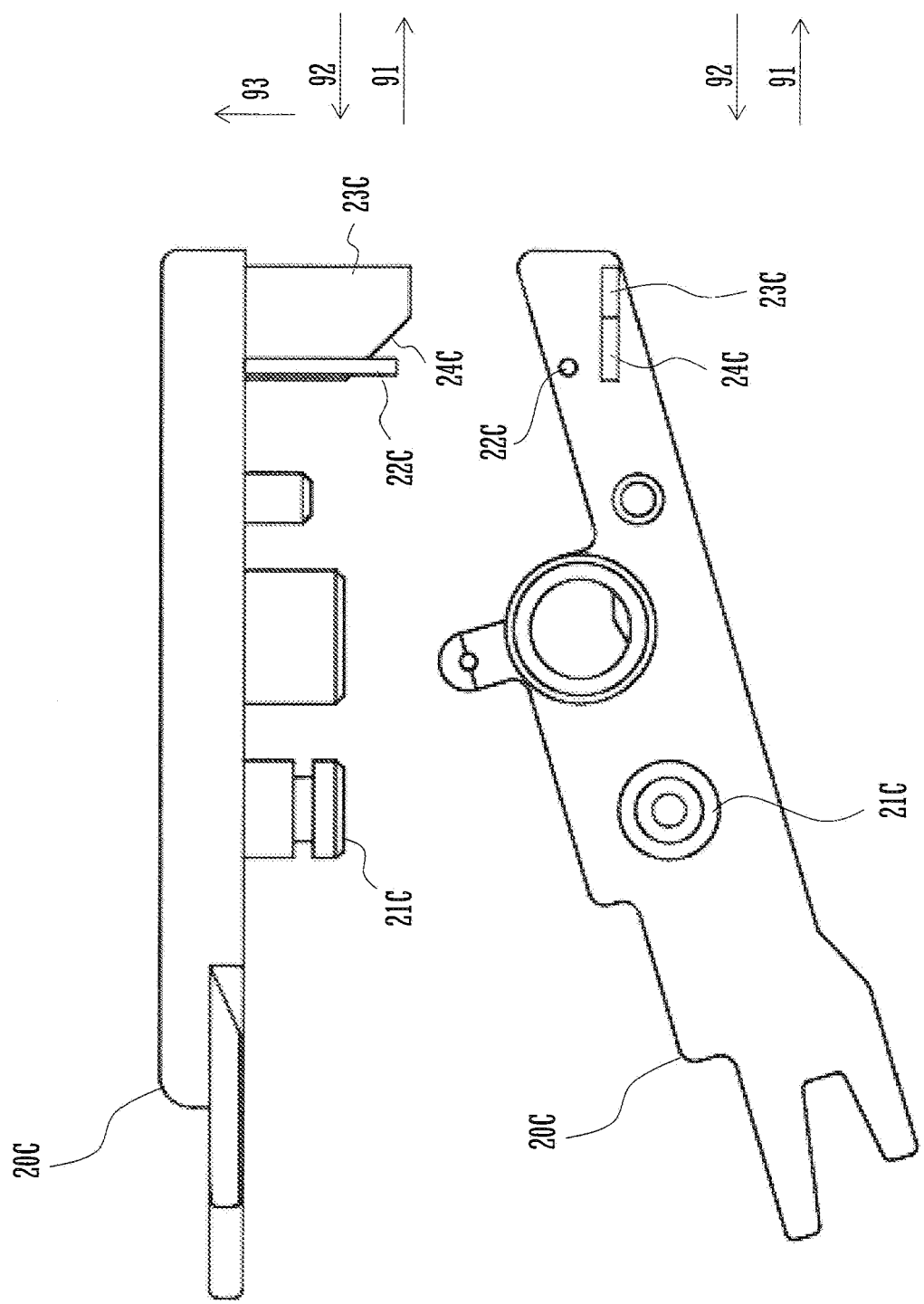

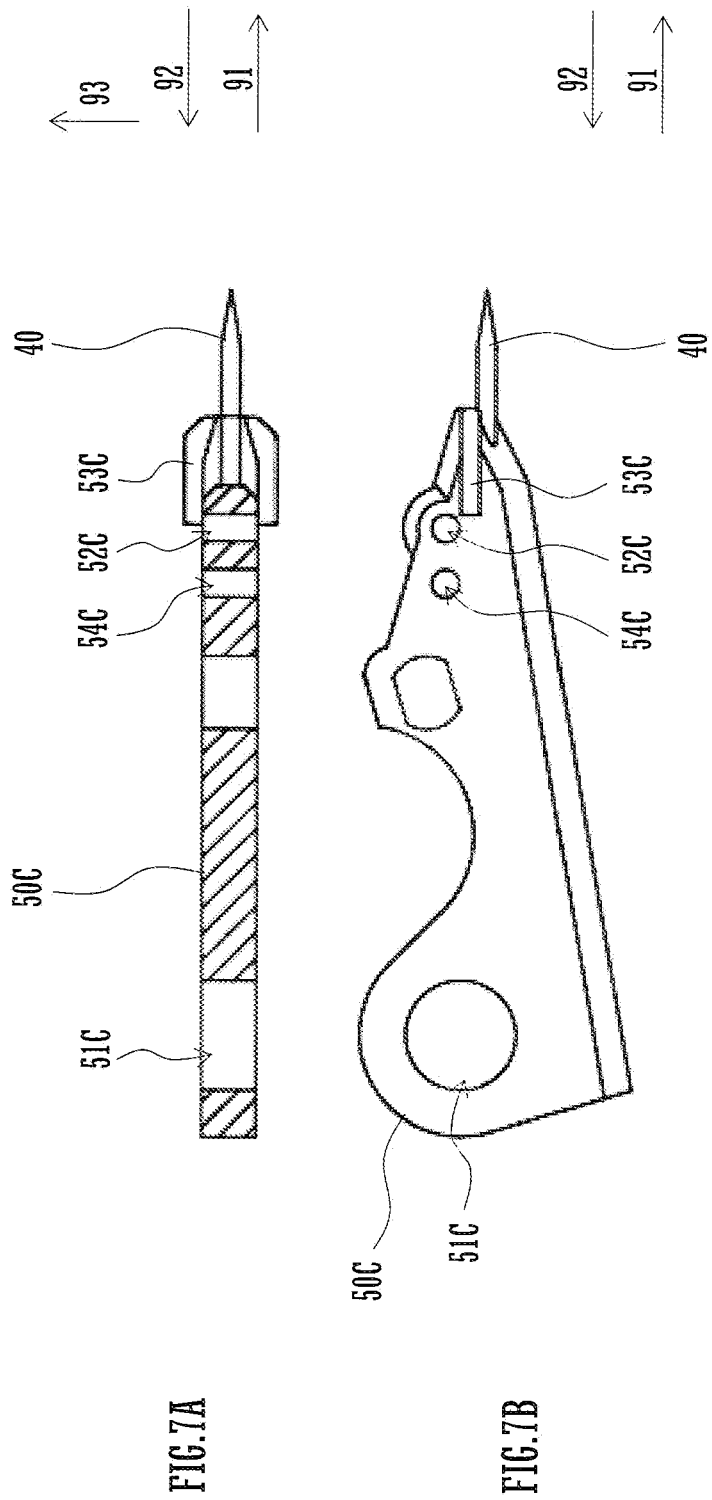

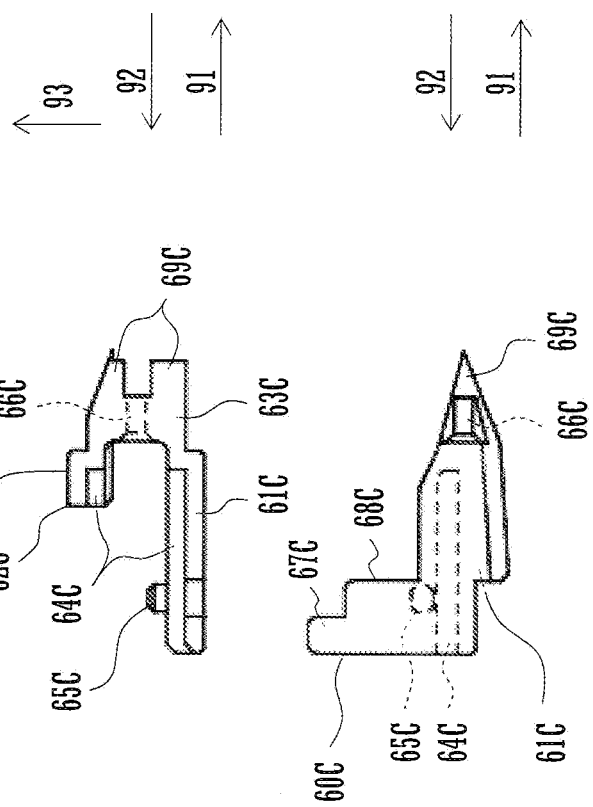

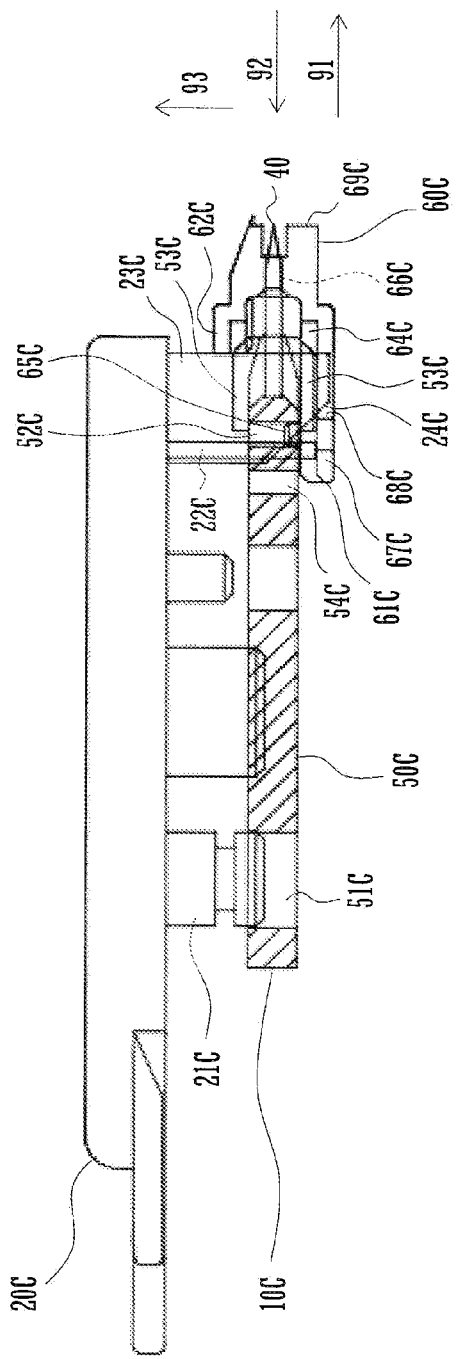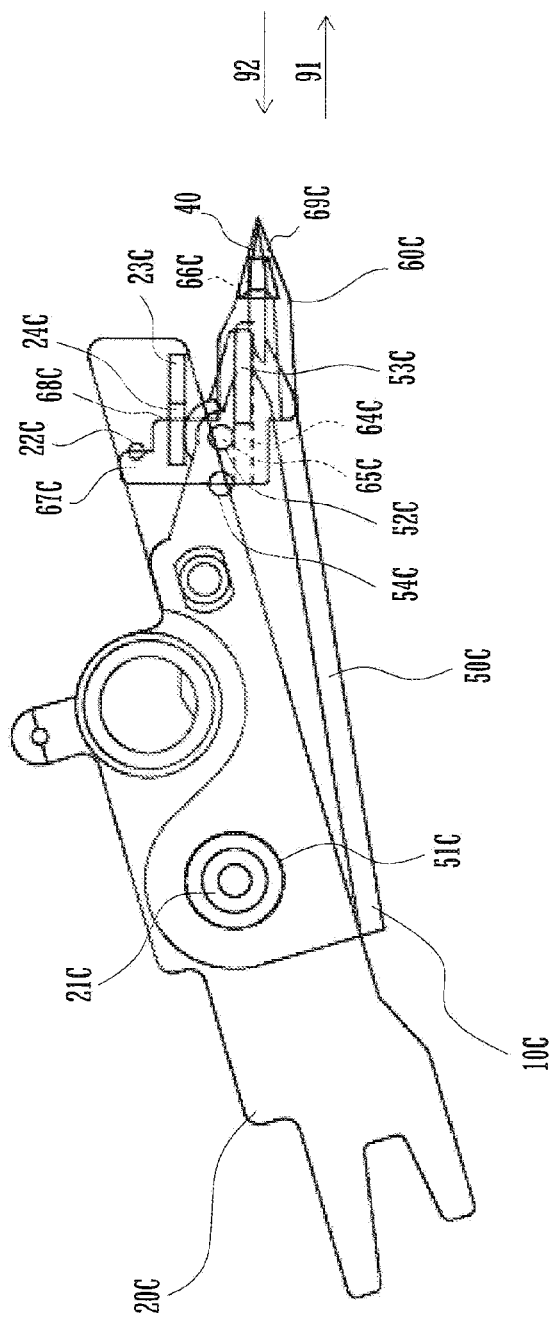
FIG.9A
FIG.9B

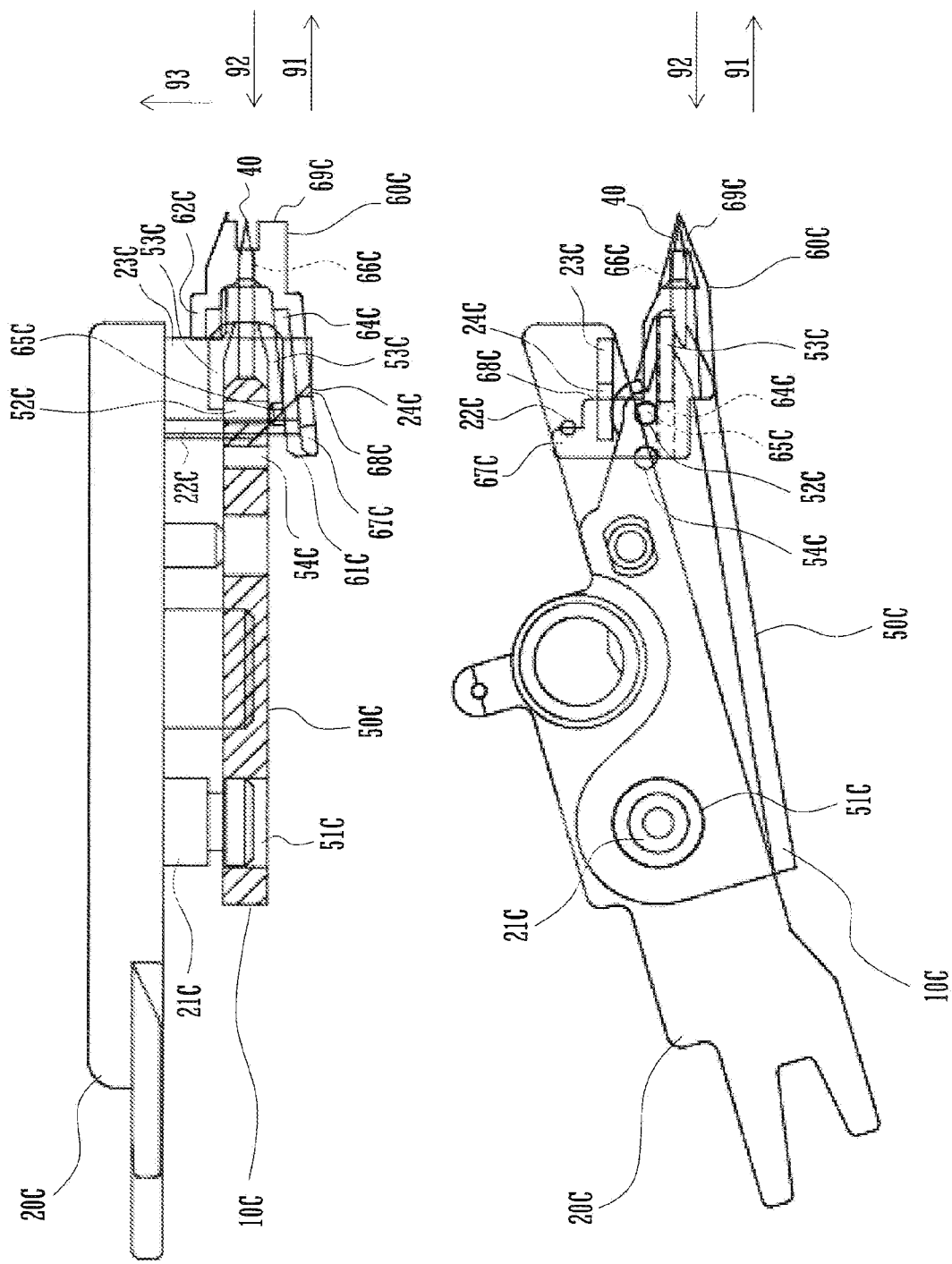

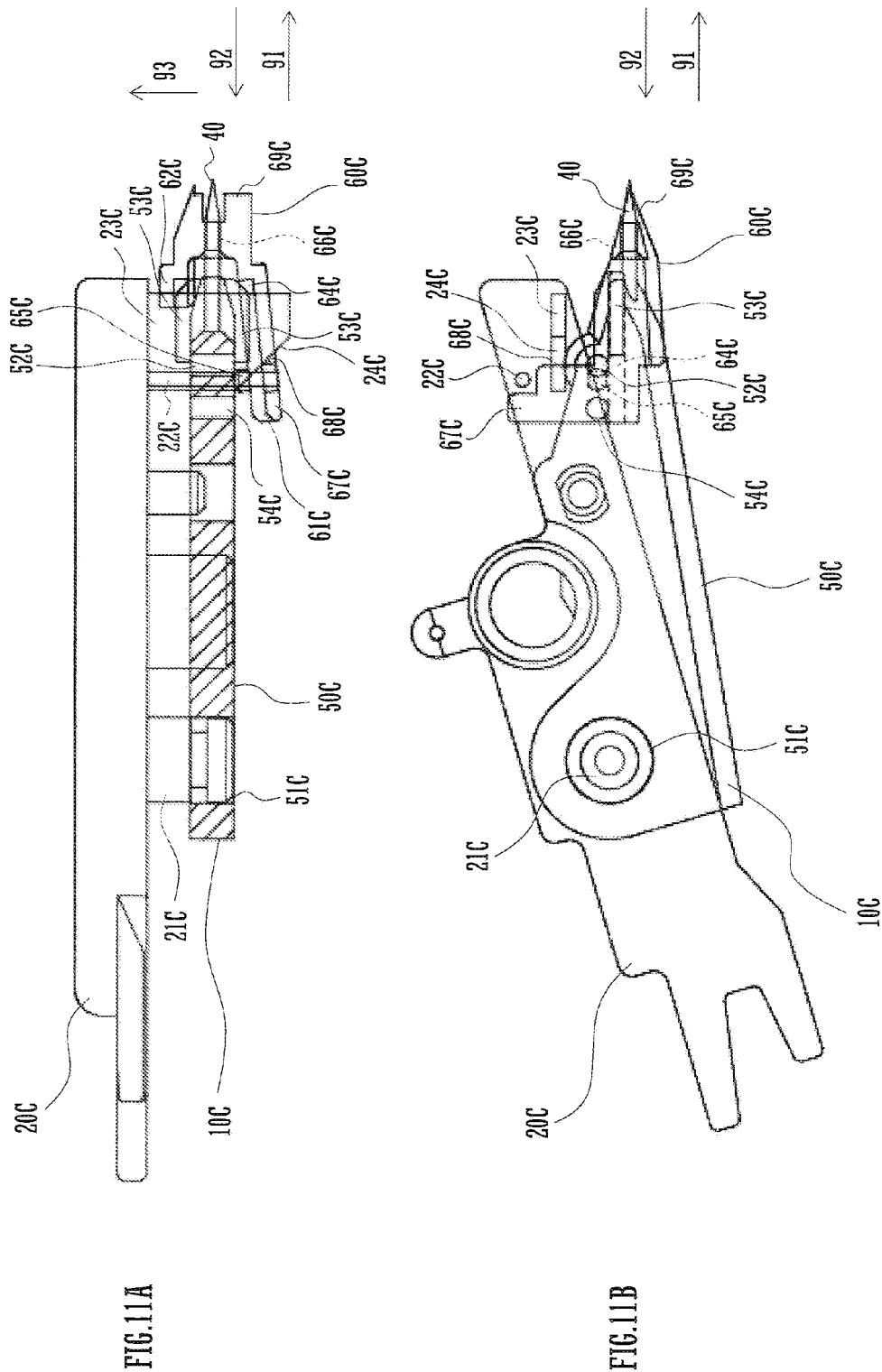

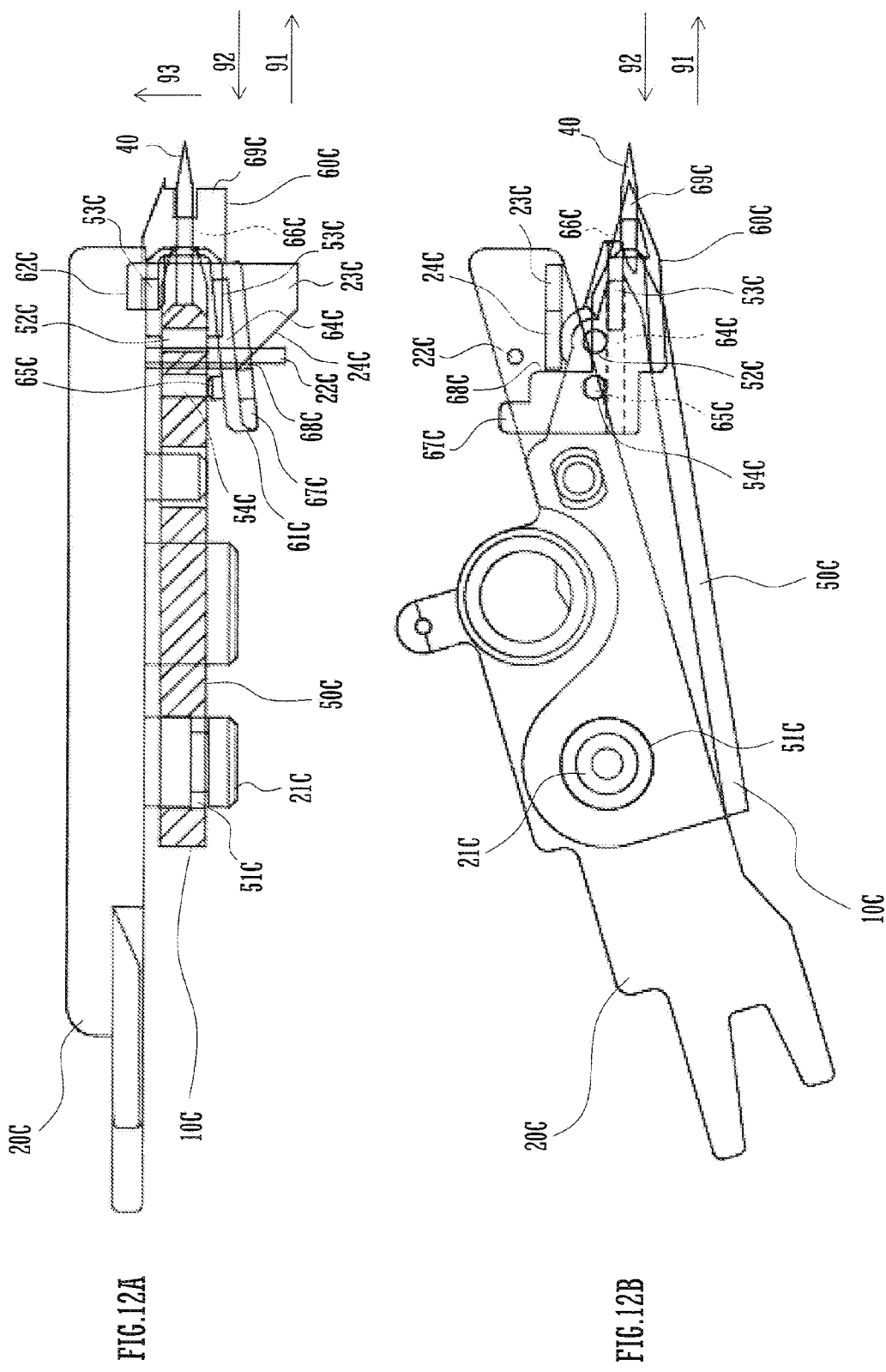

PAPER STRIPPING MEMBER AND IMAGE FORMING APPARATUS

CROSS REFERENCE

This Nonprovisional application claims priority under 35 U.S.C. §119(a) on Patent Application No. 2011-238107 filed in Japan on Oct. 31, 2011, the entire contents of which are hereby incorporated by reference.

BACKGROUND OF THE INVENTION

The present invention relates to a paper stripping member that is removably supported by a predetermined supporting member disposed facing a circumferential surface of a rotary body and that strips a paper sheet off the circumferential surface of the rotary body, and to an image forming apparatus provided with the same.

For the purpose of stripping a paper sheet off a circumferential surface of a rotary body such as photoreceptor drum, transfer roller, fuser roller or the like, a paper stripping member is sometimes used. Conventional paper stripping member each include an acute-shaped stripping nail and a holding member holding the stripping nail, and are each disposed in such a manner that a tip portion of the stripping nail is in contact with the circumferential surface of the rotary body with pressure (for example, refer to the Japanese Patent Unexamined Publication No. 2001-255683 bulletin).

For this reason, it becomes necessary for the stripping nail to be replaced when the tip portion is worn away by friction with the rotary body in the course of stripping many paper sheets.

However, with the conventional paper sheet stripping members, which have not been each provided with a member covering the stripping nail, it has been experienced that the stripping nail was easily deformed and/or damaged when the stripping member was dropped by mistake at the time when replacement of the stripping nail was carried out. Besides, in the conventional paper sheet stripping member, since the entire part of the stripping nail is exposed at the time when its replacement is carried out, a maintenance operator is required to pay a high degree of attention to his or her safety.

Although producing a stripping nail with a shortened amount of its projection from the holding member is also conceivable, the manufacture of such a nail is difficult because the shorter the stripping nail is the more difficult it becomes to be held in the manufacturing process such as insert molding and the like.

The present invention is directed to providing a paper stripping member capable of preventing a stripping nail from being deformed and/or damaged and to improving the safety of an operator at the time when replacement of the stripping nail is carried out, and an image forming apparatus provided with the same.

SUMMARY OF THE INVENTION

A paper stripping member of the present invention is removably supported by a predetermined supporting member disposed facing a circumferential surface of a rotary body, and strips a paper sheet off the circumferential surface. The paper stripping member comprises an acute-shaped stripping nail, a holding member and a cover member. The holding member is configured so as to be attachable to and removable from the supporting member, and holds the stripping nail in such a manner that the stripping nail extends toward the circumferential surface. The cover member is configured removably from the holding member, and covers at least part of the stripping nail in an extending direction toward which the stripping nail extends in a state where the cover member is attached to the holding member.

In this configuration, the cover member covering at least part of the stripping nail in the extending direction is provided, and the cover member is configured so as to be attachable to and removable from the holding member. For this reason, replacement of the stripping nail can be carried out with the cover member attached to the holding member, that is to say, with at least part of the stripping nail in the extending direction covered by the cover member. Therefore, the amount of projection of the stripping nail from the cover member is shortened at the time when the replacement of the stripping nail is carried out.

An image forming apparatus of the present invention is provided with a paper stripping member with the configuration as above mentioned. This enables the replacement of the stripping nail to be carried out with the cover member attached to the holding member, that is to say, with at least part of the stripping nail in the extending direction covered by the cover member.

The present invention makes it possible to prevent a stripping nail from being deformed and/or damaged and to improve the safety of an operator at the time when its replacement is carried out.

BRIEF DESCRIPTION OF THE DRAWINGS

FIG. 3A and FIG. 3B are front views of the paper stripping member, with FIG. 3A showing its disjoined view, and FIG. 3B being a drawing showing a state where a cover member is attached to a holding member.

FIG. 4A and FIG. 4B are front views of a paper stripping member according to a second embodiment, with FIG. 4A showing its disjoined view, and FIG. 4B being a drawing showing a state where a cover member is attached to a holding member.

FIG. 5A and FIG. 5B are front views of a paper stripping member according to a third embodiment, with FIG. 5A showing its disjoined view, and FIG. 5B being a drawing showing a state where a cover member is attached to a holding member.

FIG. 6A and FIG. 6B are drawings showing a supporting member installed in an image forming apparatus to which a paper stripping member according to a fourth embodiment is applied, with FIG. 6A being its top view, and FIG. 6B being its front view.

FIG. 7A and FIG. 7B are drawings showing a holding member of the paper stripping member according to the fourth embodiment, with FIG. 7A being its sectional plan view, and FIG. 7B being its front view.

FIG. 8A and FIG. 8B are drawings showing a cover member of the paper stripping member according to the fourth embodiment, with FIG. 8A being its top view, and FIG. 8B being its front view.

FIG. 9A and FIG. 9B are drawings showing a stage through which the paper stripping member according to the fourth embodiment is attached to the supporting member, with FIG. 9A being its top view, and FIG. 9B being its front view.

FIG. 10A and FIG. 10B are drawings showing another stage through which the paper stripping member according to the fourth embodiment is attached to the supporting member, with FIG. 10A being its top view, and FIG. 10B being its front view.

FIG. 11A and FIG. 11B are drawings showing still another stage through which the paper stripping member according to the fourth embodiment is attached to the supporting member, with FIG. 11A being its top view, and FIG. 11B being its front view.

FIG. 12A and FIG. 12B are drawings showing further still another stage through which the paper stripping member according to the fourth embodiment is attached to the supporting member, with FIG. 12A being its top view, and FIG. 12B being its front view.

DETAILED DESCRIPTION OF THE INVENTION

Figure 1:
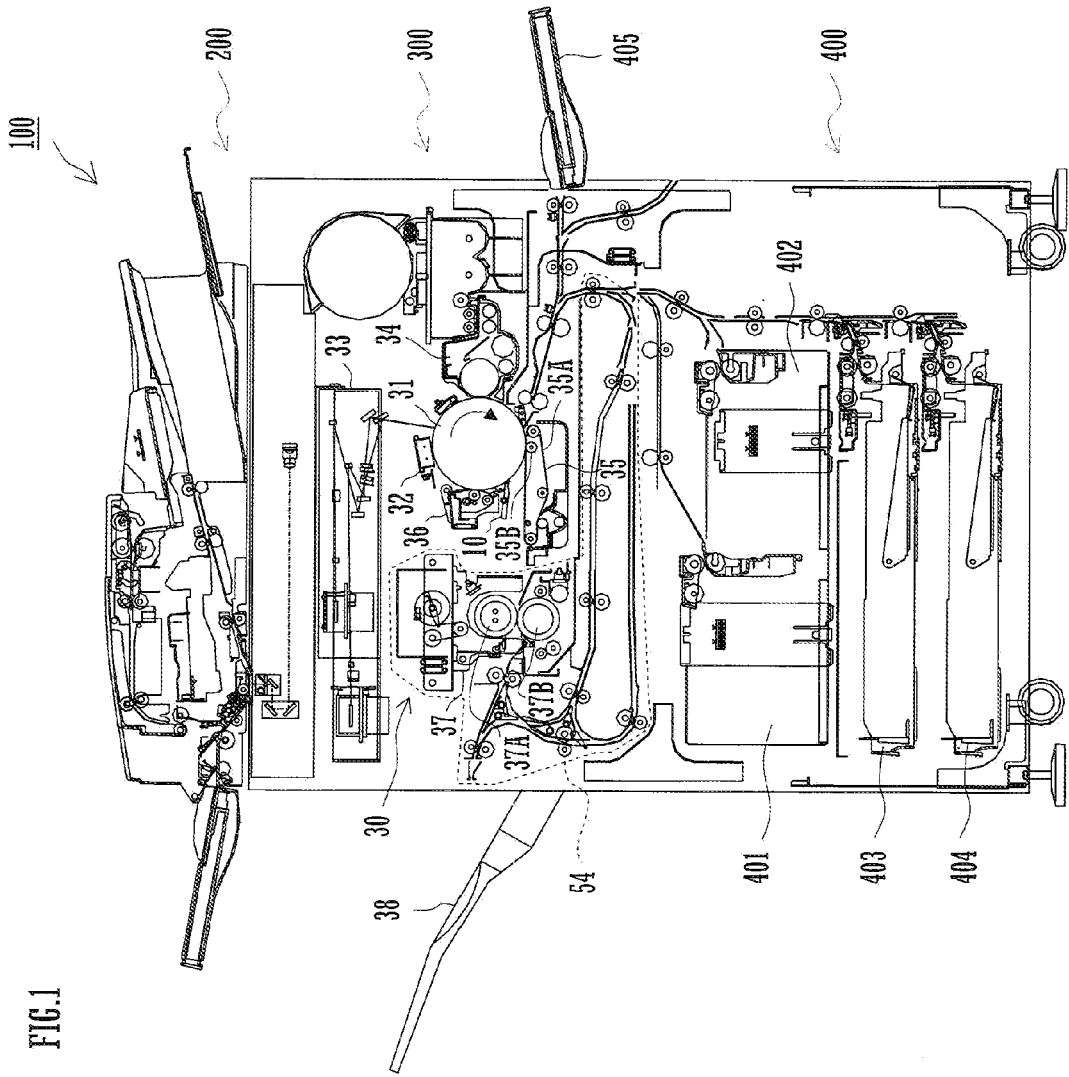
FIG. 1 is a drawing showing a general configuration of an image forming apparatus provided with a paper stripping member according to a first embodiment of the present invention.

As shown in FIG. 1, an image forming apparatus 100 to which a paper stripping member 10 according to a first embodiment of the present invention is applied includes an image reading section 200, an image forming section 300 and a paper feeding section 400.

The image reading section 200 acquires an electric signal depending on a light quantity of the light reflected at an image plane of a document; and the electric signal, after varieties of image processing have been performed thereon, is once stored as image data in a memory section equipped in the image forming apparatus 100, and is inputted to the image forming section 300 as the need arises.

The image forming section 300 includes a processing section 30. The processing section 30 includes a photoreceptor drum 31, an electrostatic charger 32, an exposure device 33, a developing device 34, a transfer unit 35, a cleaner 36 and a fuser unit 37.

The photoreceptor drum 31 has a photosensitive layer on its circumferential surface, and rotates toward a predetermined direction. The electrostatic charger 32 charges the circumferential surface of the photoreceptor drum 31 to a predetermined electrostatic potential.

The exposure device 33 projects a light based on the image data to the circumferential surface of the photoreceptor drum 31. This causes an electrostatic latent image to be formed on the circumferential surface of the photoreceptor drum 31 due to the photoconduction effect of the photosensitive layer.

The developing device 34 supplies the circumferential surface of the photoreceptor drum 31 with a toner, thereby rendering the electrostatic latent image visible in a toner image.

The transfer unit 35 is disposed under the photoreceptor drum 31, and includes a transfer belt 35A and a transfer roller 35B. The transfer belt 35A is passed over a plurality of rollers and tensioned therewith forming a looped shape, and has a predetermined electrical resistivity. The transfer roller 35B is disposed on the inner side of the loop-like path of movement of the transfer belt 35A so as to be in contact with the circumferential surface of the photoreceptor drum 31 with pressure sandwiching the transfer belt 35A in between. A predetermined transfer voltage is applied to the transfer roller 35B when the toner image is transferred. The application of the transfer voltage to the transfer roller 35B causes a transfer field to be formed at a transfer position where the transfer belt 35A and the circumferential surface of the photoreceptor drum 31 face each other, thereby causing the toner image borne on the circumferential surface of the photoreceptor drum 31 to be transferred onto a paper sheet passing the transfer position.

The cleaner 36 removes the remaining toner from the circumferential surface of the photoreceptor drum 31 that has completed the transfer of the toner image onto the paper sheet.

Between the transfer roller 35B and the cleaner 36 around the photoreceptor drum 31 is disposed a paper stripping member 10.

The fuser unit 37 is disposed on the downstream side of the transfer position along a paper sheet conveyance direction. The fuser unit 37 has a heating roller 37A and a pressing roller 37B. The fuser unit 37 causes an unfixed toner image borne on the paper sheet to be fixed thereon by heat and pressure.

The paper sheet on which an image has been formed is received in a paper receiving tray 38.

The paper feeding section 400 includes paper feed cassettes 401, 402, 403, 404, and a hand-fed paper tray 405. The paper feeding section 400 supplies a paper sheet piece by piece from any of the paper feed cassettes 401, 402, 403, 404 or the hand-fed paper tray 405 to the processing section 30. For the paper, normal paper, photographic paper, or sheet recording medium such as OHP film or the like can be exemplified.

Figure 2:
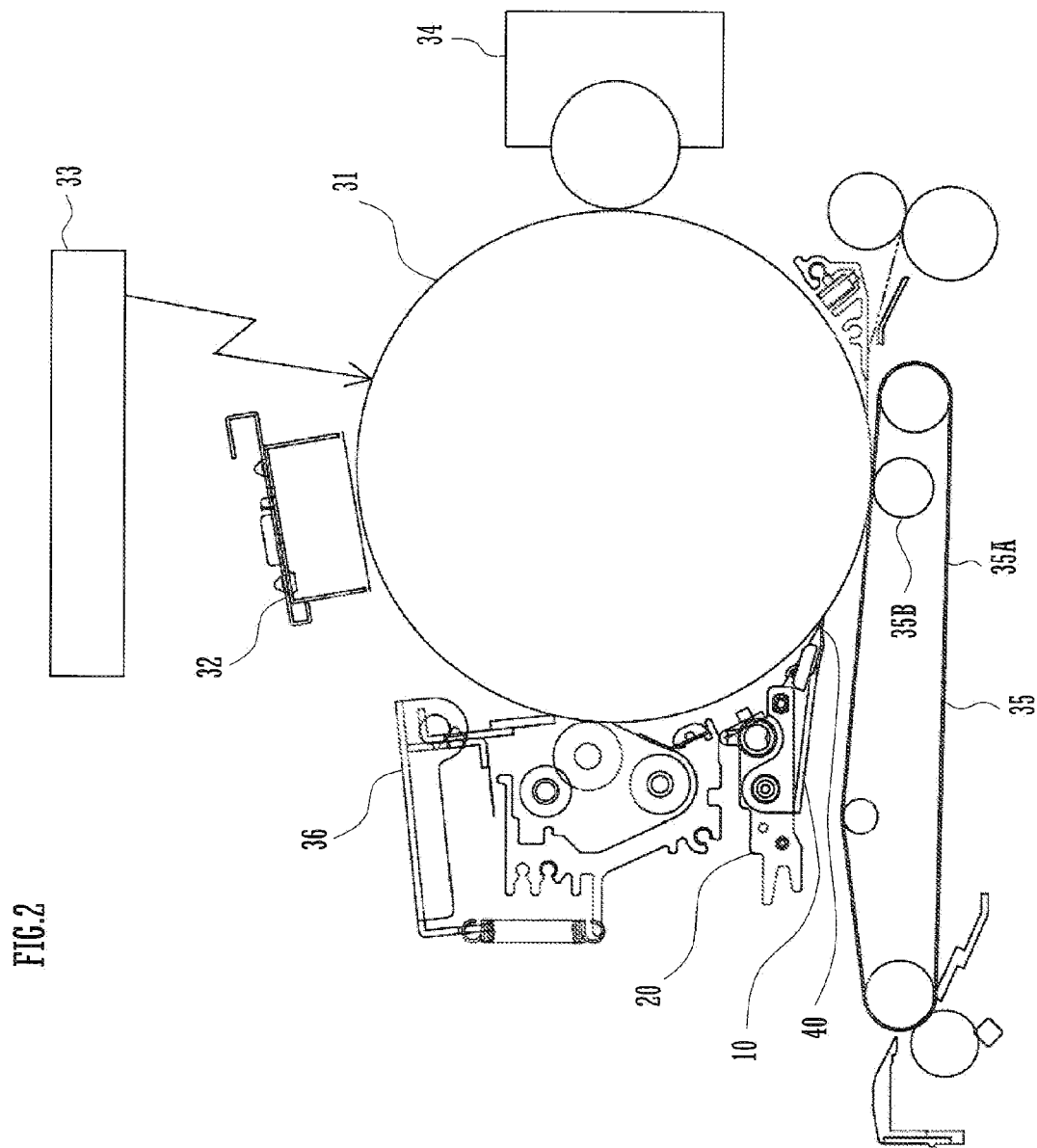
FIG. 2 is a drawing showing the paper stripping member together with its neighboring members.

As shown in FIG. 2, the transfer electric field is formed at the transfer position where the circumferential surface of the photoreceptor drum 31 and the transfer belt 35A face each other. The paper sheet provided from the paper feeding section 400 is supplied to the transfer position, and there it is brought into contact with the circumferential surface of the photoreceptor drum 31 with pressure. The toner image borne on the circumferential surface of the photoreceptor drum 31 is transferred onto the paper sheet by the transfer electric field. Because the paper sheet is charged with electricity through its passage across the transfer electric field, it is apt to be adsorbed onto the circumferential surface of the photoreceptor drum 31. The paper stripping member strips the paper sheet adsorbed electrostatically onto the circumferential surface of the photoreceptor drum 31 off the circumferential surface of the photoreceptor drum 31.

At a predetermined position facing the circumferential surface of the photoreceptor drum 31 between the transfer roller 35B and the cleaner 36, a supporting member 20 is disposed. The paper stripping member 10 is removably supported by the supporting member 20.

As shown in FIG. 3A and FIG. 3B, the paper stripping member 10 includes a holding member 50 and a cover member 60, in addition to a stripping nail 40.

The stripping nail 40 is a needlelike metallic object, thus taking an acute shape. Because the stripping nail 40 is made of metal, its durability against abrasion due to friction with the circumferential surface of the photoreceptor drum 31 is high.

The holding member 50 generally takes a plate-like shape, and has a fitting hole 51, a first hole 52 and a first rib 53. The holding member 50 is configured so as to be attachable to and removable from the supporting member 20. The holding member 50 holds a root end portion of the stripping nail 40 at an edge portion on the fitting hole 51's opposite side.

By causing the fitting hole 51 to fit on a guide axis of the supporting member 20, the paper stripping member 10 is attached to the supporting member 20 in such a manner that the stripping nail 40 extends toward the circumferential surface of the photoreceptor drum 31. The paper stripping member 10 is configured so as to be swingable around the guide axis, and is urged by an elastic member such as spring, not illustrated, in such a manner that the stripping nail 40 is brought into contact with the circumferential surface of the photoreceptor drum 31 with pressure.

The first rib 53 is provided in the vicinity of the stripping nail 40, and is formed so as to extend parallelly with a direction 91 toward which the stripping nail 40 extends. As an example, the first rib 53 is provided on both side faces of the holding member 50.

The first hole 52 is provided in the vicinity of an end portion of the first rib 53 on the downstream side in an extending direction 92 toward which the cover member 60 is attached to the holding member 50 and which is the direction opposite to the extending direction 91.

The cover member 60 is made of an elastic resin, and has a pair of holding portions 61, 62 (although the holding portion 62 is not illustrated) and a joint portion 63. The holding portions 61, 62 are respectively supported by the joint portion 63 at their end portions on the upstream side in the attaching direction 92, facing each other. The holding portions 61, 62 are each provided with a guide groove 64 through which the first rib 53 slides and which is guided by the first rib 53. Additionally, one holding portion 61 is provided with a first protruded portion 65 that is elastically fittable in the first hole 52. Further, the joint portion 63 is provided with a needle hole 66 through which the stripping nail 40 is penetrable.

By passing the stripping nail 40 through the needle hole 66 and moving the cover member 60 relative to the holding member 50 toward the attaching direction 92 while causing the guide groove 64 to slide on the first rib 53, the pair of holding portions 61, 62 are caused to sandwich the holding member 50 by an elastic force, which causes the first protruded portion 65 to fit elastically in the first hole 52. With the first rib 53 fitting in the guide groove 64 and with the first protruded section 65 elastically fitting in the first hole 52, the cover member 60 is attached to the holding member 50.

On the other hand, since the cover member 60 is elastic, the cover member 60 is removed from the holding member 50 by bending the pair of the holding portions 61, 62 toward a direction leading to each other's separation and pulling the first protruded portion 65 out of the first hole 52, and then by moving the cover member 60 relative to the holding member 50 toward the extending direction 91.

Because the stripping nail 40 is passed through the needle hole 66 with the cover member 60 attached to the holding member 50, part of the stripping nail 40 in the extending direction 91 is covered by the cover member 60 from all the directions perpendicular to the extending direction 91. That is to say, the part of the stripping nail 40 in the extending direction 91 is covered by the cover member 60 over its entire perimeter.

Since the cover member 60 is configured so as to be attachable to and removable from the holding member 50, replacement of the stripping nail 40 can be carried out with the cover member 60 attached to the holding member 50, that is to say, with the part of the stripping nail 40 in the extending direction covered by the cover member 60. Therefore, an amount of projection of the stripping nail 40 from the cover member 60 is shortened at the time when the replacement of the stripping nail 40 is carried out. Accordingly, not only can the stripping nail 40 be prevented from being deformed and/or damaged, but also the safety of an operator can be improved at the time when the replacement of the stripping nail 40 is carried out.

As shown in FIG. 4A and FIG. 4B, a paper stripping member 10A according to a second embodiment is configured in the same manner as the paper stripping member 10, except a direction in which a cover member 60A is attached to a holding member 50A. In the paper stripping member 10A, a first rib 53A of the holding member 50A is provided so as to extend along the vertical direction perpendicular to the extending direction 91. As an example, two first ribs 53A are provided in such a manner as to sandwich the first hole 52.

The cover member 60A takes a U-shaped cross section opening downward. A guide groove 64A is provided extending along the vertical direction perpendicular to the extending direction 91 so as to be guided by the first rib 53A. As an example, two guide grooves 64A are provided in such a manner as to sandwich the first protruded portion 65.

In the paper stripping member 10A, the cover member 60A is attached to the holding member 50A from the upper side. The stripping nail 40 is covered at part thereof in the extending direction 91 by the cover member 60A from three directions perpendicular to the extending direction 91.

Also in the paper stripping member 10A, replacement of the stripping nail 40 can be carried out with the cover member 60A attached to the holding member 50A, and thus with the part of the stripping nail 40 in the extending direction 91 covered by the cover member 60A.

As shown in FIG. 5A and FIG. 5B, a paper stripping member 10B according to a third embodiment is configured in the same manner as the paper stripping member 10A, except a direction in which a cover member 60B is attached to a holding member 50B.

In the paper stripping member 10B, a first rib 53B of the holding member 50B is provided so as to extend along the vertical direction perpendicular to the extending direction 91. As an example, two first ribs 53B are provided in such a manner as to sandwich the first hole 52.

The cover member 60B takes a U-shaped cross section opening upward. A guide groove 64B is provided extending along the vertical direction perpendicular to the extending direction 91 so as to be guided by the first rib 53B. As an example, two guide grooves 64B are provided in such a manner as to sandwich the first protruded section 65.

In the paper stripping member 10B, the cover member 60B is attached to the holding member 50B from the underside. The stripping nail 40 is covered at part thereof in the extending direction 91 by the cover member 60B from three directions perpendicular to the extending direction 91.

Also in the paper stripping member 10B, replacement of the stripping nail 40 can be carried out with the cover member 60B attached to the holding member 50B, and thus with part of the stripping nail 40 in the extending direction 91 covered by the cover member 60B.

Subsequently, using FIG. 6A through FIG. 13B, an image forming apparatus 100 to which a paper stripping member 10C according to a fourth embodiment is applied is explained. There, in FIG. 6A through FIG. 13B, for the convenience of explanation, there are portions where hidden lines are shown by solid lines.

As shown in FIG. 6A and FIG. 6B, the supporting member 20C has a guide axis 21C, a second protruded portion 22C and a second rib 23C respectively projecting toward the upstream side of a direction 93 in which the holding member 50C is attached to the supporting member 20C and which is perpendicular to the extending direction 91.

The second rib 23C extends along the extending direction 91. The second rib 23C has an oblique section 24C at an edge portion of the rib 23C on the upstream side in the mounting direction 93. The oblique section 24C has an inclination inclining in such a manner that the more a point thereon goes toward the downstream side in the direction 92 in which the cover member 60C is attached to the holding member 50C and which is the direction opposite to the extending direction 91 the more it goes toward the downstream side in the mounting direction 93.

As shown in FIG. 7A and FIG. 7B, the holding member 50C generally takes a plate-like shape, and has a fitting hole 51C, a first hole 52C, a first rib 53C and a second hole 54C. The holding member 50C holds the root end portion of the stripping nail 40.

The fitting hole 51C is configured so as to slide along the mounting direction 93 while fitting on the guide axis 21C of the supporting member 20C. Fitting the fitting hole 51C on the guide axis 21C causes the holding member 50C to be attached to the supporting member 20C; and pulling the fitting hole 51C out of the guide axis 21C causes the holding member 50C to leave the supporting member 20C.

The first rib 53C is provided in the vicinity of the stripping nail 40, and is formed so as to extend parallelly with the extending direction 91 of the stripping nail 40. The first rib 53C is provided on both side faces of the holding member 50C.

The first hole 52C is provided in the vicinity of an end portion of the first rib 53C on the downstream side in the attaching direction 92. The second hole 54C is provided on the downstream side from the first hole 52C in the attaching direction 92.

As shown in FIG. 8A and FIG. 8B, the cover member 60C is made of an elastically deformable resin, is attachable to and removable from the holding member 50C, and has a pair of holding portions 61C, 62C and a joint portion 63C.

The holding portions 61C, 62C, are respectively supported by the joint portion 63C at their end portions on the upstream side in the attaching direction 92, and face each other on the downstream side from the joint portion 63C in the attaching direction 92. The holding portions 61C, 62C are each provided with a guide groove 64C through which the first rib 53C slides and which is guided by the first rib 53C. Additionally, one holding portion 61C is provided with a first protruded portion 65C that is elastically fittable in the first hole 52C and the second hole 54C. The first protruded portion 65C is configured so as to be elastically fittable in the first hole 52C with the cover member 60C covering the entire part of the stripping nail 40 in the extending direction 91.

The joint portion 63C has a needle hole 66C through which the stripping nail 40 is penetrable. Also, the joint portion 63C has a pair of tongue portions 69C projecting from the portion forming the needle hole 66C toward the upstream side in the attaching direction 92. In a state where the cover member 60C is attached to the holding member 50C, the pair of tongue portions 69C cover the stripping nail 40 from two opposite directions perpendicular to the extending direction 91.

Further, the cover member 60C has a press portion 67C and a slide portion 68C. The press portion 67C extends from the holding portion 61C toward upside in a tongue shape, and an edge portion of the press portion 67C on the upstream side in the attaching direction 92 corresponds to the slide portion 68C. The first protruded portion 65C is provided on the underside of the press portion 67C, and the first protruded portion 65C is also displaced when the press portion 67C is pressed.

As shown in FIG. 9A and FIG. 9B, by passing the stripping nail 40 through the needle hole 66C and moving the cover member 60C relative to the holding member 50C toward the attaching direction 92 while causing the guide groove 64C to slide on the first rib 53C, the pair of holding portions 61C, 62C are caused to sandwich the holding member 50C by an elastic force, which causes the first protruded portion 65C to fit elastically in the first hole 52C. This brings the cover member 60C to a first attachment state in which it covers the entire part of the stripping nail 40 in the extending direction 91. The first hole 52C, the first protruded portion 65C, the first rib 53C and the guide groove 64C are included in a first retention mechanism that causes the holding member 50C to hold the cover member 60C in the first attachment state.

In the first attachment state, the stripping nail 40 is passed through the needle hole 66C; therefore, at least part of the stripping nail 40 in the extending direction 91 is covered by the cover member 60C from all the directions perpendicular to the extending direction 91. That is to say, at least the part of the stripping nail 40 in the extending direction 91 is covered by the cover member 60C over its entire perimeter.

Because the entire part of the stripping nail 40 in the extending direction 91 is covered by the cover member 60C at the time when the holding member 50C is attached to and removed from the supporting member 20C, not only can the stripping nail 40 be further prevented from being deformed and/or damaged, but also the safety of an operator can be improved more at the time when the replacement of the stripping nail 40 is carried out.

As shown in FIG. 10A and FIG. 10B, by fitting the fitting hole 51C of the holding member 50C on the guide axis 21C of the supporting member 20C, and by displacing the holding member 50C in a state where the first protruded portion 65C elastically fits in the first hole 52C relative to the supporting member 20C toward the downstream side in the mounting direction 93 while causing the fitting hole 51C to slide on the guide axis 21C, the press portion 67C of the cover member 60C is caused to be pressed by the second protruded portion 22C of the supporting member 20C and then to be displaced to a direction in which the press portion 67C separates from the holding member 50C, and thereby the first protruded portion 65C of the cover member 60C comes out of the first hole 52C of the holding member 50C.

As shown in FIG. 11A, FIG. 11B, FIG. 12A and FIG. 12B, as the holding member 50C is displaced further relative to the supporting member 20C to the downstream side in the mounting direction 93, the slide portion 68C of the cover member 60C slides on the oblique section 24C of the second rib 23C of the supporting member 20C, and thus the cover member 60C is displaced relative to the holding member 50C to the downstream side in the attaching direction 92 while the first guide groove 64C is guided by the rib 53C.

Figure 13A:
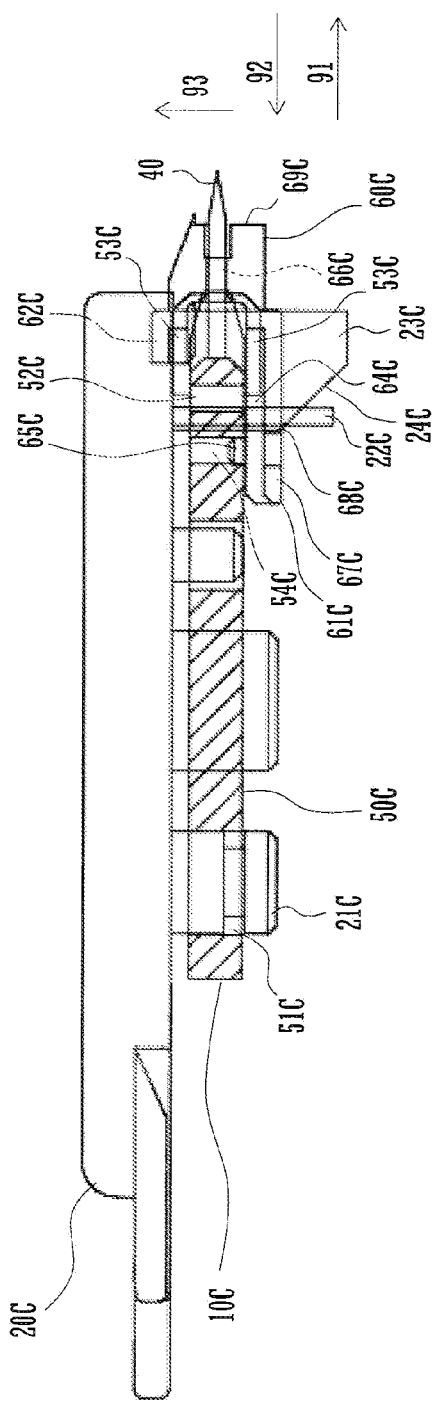
FIG. 13A and FIG. 13B are drawings showing yet further still another stage through which the paper stripping member according to the fourth embodiment is attached to the supporting member, with FIG. 13A being its top view, and FIG. 13B being its front view.
Figure 13B:
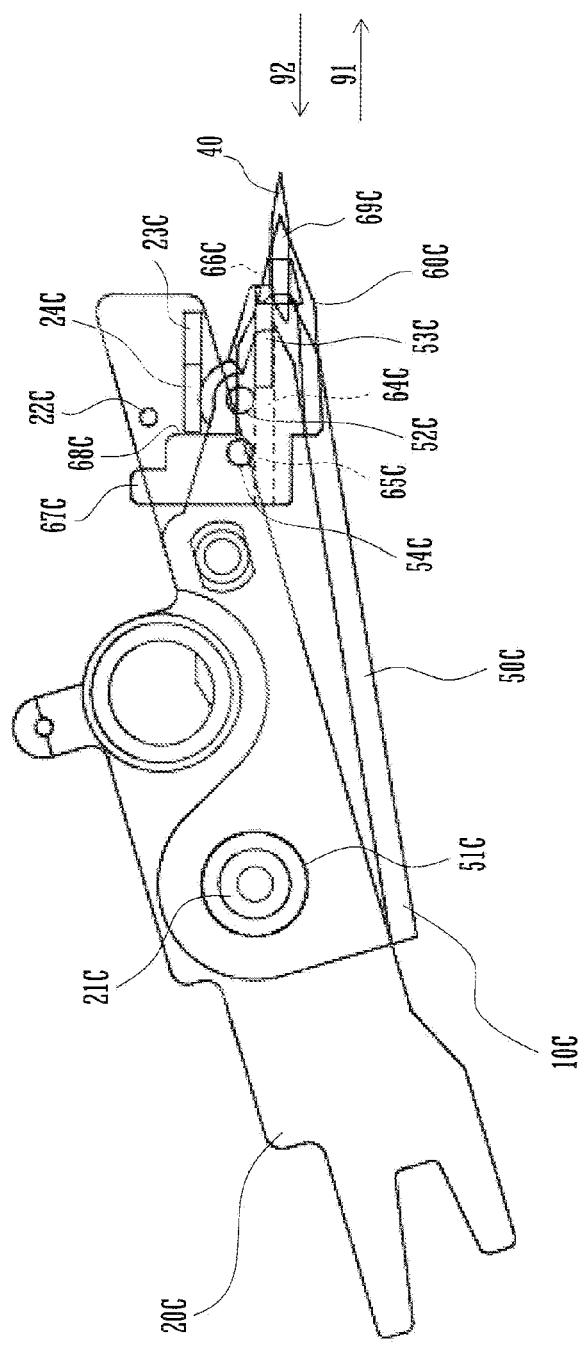

As shown in FIG. 13A and FIG. 13B, this causes the first protruded portion 65C of the cover member 60C to fit elastically in the second hole 54C of the holding member 50C, and thus the cover member 60C is brought to a second attachment state in which the tip portion of the stripping nail 40 is exposed from the cover member 60C, thereby rendering the paper stripping member 10C ready to strip the paper sheet off the circumferential surface of the photoreceptor drum 31. In this manner, with the paper stripping member 10C attached to the supporting member 20C, it is possible to change the state of the paper stripping member 10C from the state in which the tip portion of the stripping nail 40 is covered by the cover member 60C to the state in which it is exposed, without carrying out other operations, thereby improving workability.

The second protruded portion 22C, the press portion 67C, the oblique section 24C of the second rib 23C and the slide portion 68C are included in a displacement mechanism that causes the cover member 60C to be displaced relative to the holding member 50C from the first attachment state to the second attachment state in which the tip portion of the stripping nail 40 is exposed from the cover member 60C, as the holding member 50C is displaced relative to the supporting member 20C to the downstream side in the mounting direction 93.

The second hole 54C, the first protruded portion 65C, the first rib 53C and the guide groove 64C are included in a second retention mechanism that causes the holding member 50C to hold the cover member 60C in the second attachment state.

Further, the paper stripping member 10, 10A, 10B, 10C are not limited to ones configured so as to strip the paper sheet off the photoreceptor drum 31, so that they may be configured so as to strip the paper sheet off the heating roller 37A and/or the transfer roller 35B; and even such configurations can still produce the effect as stated that not only can the stripping nail 40 be prevented from being deformed and/or damaged but also the safety of an operator can be improved at the time when the replacement of the stripping nail 40 is carried out.

The above explanations of the embodiments are nothing more than illustrative in any respect, nor should be thought of as restrictive. Scope of the present invention is indicated by claims rather than the above embodiments. Further, it is intended that all changes that are equivalent to a claim in the sense and realm of the doctrine of equivalence be included within the scope of the present invention.

What is claimed is:

1. A paper stripping member that is removably supported by a supporting member disposed facing a circumferential surface of a rotary body, the paper stripping member comprising:
    a needle-like stripping nail configured to strip a paper sheet off the circumferential surface of the rotary body;
    a holding member that is removably attachable to the supporting member and that holds the stripping nail in such a manner that the stripping nail extends toward the circumferential surface; and
    a cover member that is removably attachable to the holding member and that covers at least part of the stripping nail in an extending direction toward which the stripping nail extends in a state where the cover member is attached to the holding member.

2. The paper stripping member as claimed in claim 1, wherein
    the holding member includes a first hole; and
    the cover member, being made of an elastic resin, includes a first protruded portion elastically fittable in the first hole.

3. The paper stripping member as claimed in claim 1, wherein
    the holding member further includes a first rib extending in one direction; and
    the cover member further includes a guide groove guided by the first rib.

4. The paper stripping member as claimed in claim 3 wherein the first rib extends parallel to the extending direction.

5. An image forming apparatus comprising:
    the paper stripping member as claimed in claim 1;
    a first retention mechanism that causes the holding member to hold the cover member in a first attachment state where the cover member covers an entire part of the stripping nail in the extending direction;
    a displacement mechanism that causes the cover member to be displaced relative to the holding member from the first attachment state to a second attachment state in which a tip portion of the stripping nail is exposed from the cover member as the holding member is displaced relative to the supporting member to a downstream side in a direction in which the holding member is attached to the supporting member and which is substantially perpendicular to the extending direction; and
    a second retention mechanism that causes the holding member to hold the cover member in the second attachment state.

6. The image forming apparatus as claimed in claim 5, wherein
    the holding member includes a first hole and a first rib that extends parallel to the extending direction;
    the cover member covers an entire part of the stripping nail when in the first attachment state, the cover member is made of an elastic resin, and the cover member includes:
        a first protruded portion that is elastically fittable in the first hole; and
        a guide groove that receives the first rib;
    the supporting member has a guide axis, a second protruded portion, and a second rib respectively projecting toward an upstream side in the direction in which the holding member is attached to the supporting member and which is substantially perpendicular to the extending direction;
    the second rib extends along the extending direction and has an oblique section at an edge portion of the second rib on the upstream side in the direction in which the holding member is attached to the supporting member, the oblique section having an inclined portion that inclines in such a manner that the more a point thereon goes toward a downstream side in a direction in which the cover member is attached to the holding member and which is a direction opposite to the extending direction, the more the point goes toward the downstream side in the direction in which the holding member is attached to the supporting member;
    the holding member further comprising:
        a fitting hole configured so as to slide along the guide axis of the supporting member in the direction in which the holding member is attached to the supporting member, and
        a second hole provided on a downstream side from the first hole in the direction in which the cover member is attached to the holding member;
    the cover member further comprising:
        a press portion which is pressed by the second protruded portion when the holding portion is displaced relative to the supporting portion in the direction in which the holding member is attached to the supporting member, the press portion, when being pressed by the second protruded portion, being displaced in a direction that causes the first protruded portion to come out of the first hole, and
        a slide portion that slides along the oblique section of the second rib as the holding member is displaced relative to the supporting member in the direction in which the holding member is attached to the supporting member.

7. The paper stripping member as claimed in claim 1, wherein the cover member covers an entire circumference of at least a portion of the stripping nail.

8. The paper stripping member as claimed in claim 1, wherein the cover member is made of an elastic resin, and includes:
    a pair of holding portions facing each other; and
    a joint portion joining the pair of holding portions with respect to each other.

9. The paper stripping member as claimed in claim 8, wherein the joint portion has a needle hole through which the stripping nail is penetrable.

10. The paper stripping member as claimed in claim 1, wherein the stripping nail has a side profile that forms an acute angle.

11. The paper stripping member as claimed in claim 1, wherein the cover member is attachable to the holding member in a first attachment state at which the cover member covers an entire exposed length of the stripping nail and in a second attachment state at which the cover member leaves an end of the stripping nail exposed.

12. A paper stripping mechanism, comprising:
   the paper stripping member of claim 11; and
   a supporting member to which the holding member is attached.

13. The paper stripping mechanism as claimed in claim 12, wherein the holding member is attached to the supporting member by displacing the holding member relative to the supporting member in a mounting direction that is substantially perpendicular to the extending direction, and wherein displacement of the holding member relative to the supporting member in the mounting direction causes the cover member to move from the first attachment state to the second attachment state.

14. The paper stripping mechanism as claimed in claim 13, wherein the supporting member includes a guide rib, and wherein when the holding member is displaced relative to the supporting member in the mounting direction to cause the holding member to be mounted on the supporting member, a slide portion of the cover member slides along the guide rib to cause the cover member to move from the first attachment state to the second attachment state.

\* \* \* \* \*